Dec. 23, 1924.
T. E. BATEMAN
RADIATOR TRUCK
Filed March 16, 1923
1,520,630
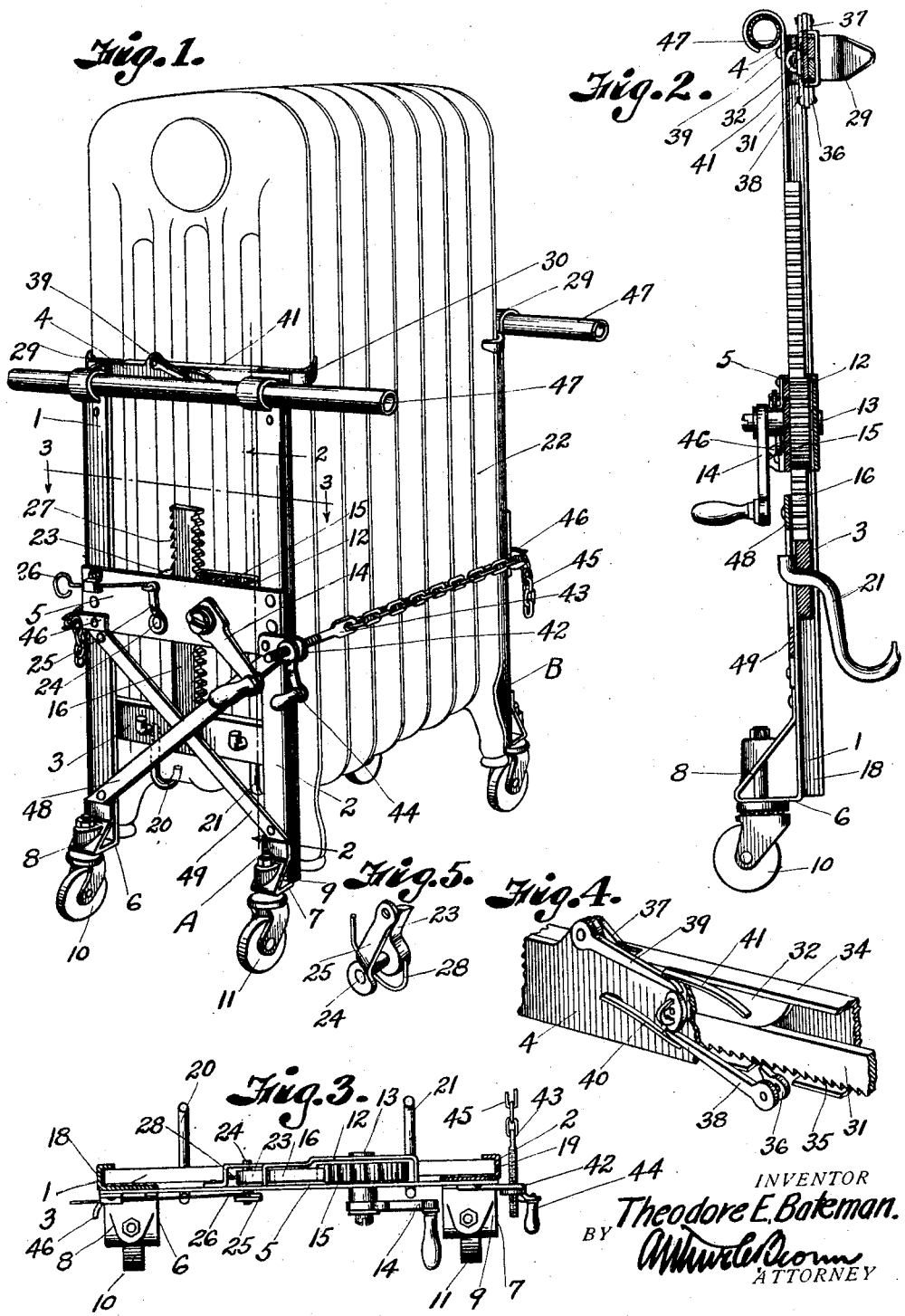
INVENTOR
Theodore E. Bateman.
BY
ATTORNEY Patented Dec. 23, 1924.

1,520,630

UNITED STATES PATENT OFFICE.

THEODORE E. BATEMAN, OF ST. JOSEPH, MISSOURI, ASSIGNOR OF FORTY-NINE ONE-HUNDREDTHS TO C. A. FISH, OF CHILLICOTHE, MISSOURI.

RADIATOR TRUCK.

Application filed March 16, 1923. Serial No. 625,507.

*To all whom it may concern:*

Be it known that I, THEODORE E. BATEMAN, a citizen of the United States, residing at St. Joseph, in the county of Buchanan and State of Missouri, have invented certain new and useful Improvements in Radiator Trucks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to trucks and particularly to a radiator truck.

The primary object of the invention is to provide a truck adapted to be used in connection with radiators and similar devices so that the radiator may be moved from place to place in a convenient manner.

The invention is particularly intended for use in carrying radiators to put them in position to be set up, and the invention consists in certain novel parts and combinations of parts, all of which will be specifically referred to hereinafter, reference being had to the accompanying drawings, in which—

Fig. 1 is a perspective view of a radiator supported by a truck constructed in accordance with my invention.

Fig. 2 is a vertical, sectional view on the line 2—2 of Fig. 1.

Fig. 3 is a sectional view on the line 3—3 of Fig. 1

Fig. 4 is a detail, perspective view of the radiator clamping jaws and the detents for holding them in clamped position.

Fig. 5 is a detail perspective view of the elevator bar or jack-holding detent.

The radiator may be supported by two trucks or truck members, each complete in itself but each supporting one end of the radiator. The two truck members may be secured together by suitable longitudinal connections so that the truck members and the radiator will all be held rigidly together. Each truck member is shown as comprising a substantially rectangular frame having vertical side bars 1 and 2, a bottom cross bar 3 slidable in the side bars and a top cross bar 4 fixed to the side bars. Between the top and bottom cross bars is an intermediate cross bar 5, which not only serves to brace the two side bars 1 and 2 but it also constitutes a bracket for holding the elevating member or jack by means of which the radiator is raised off the floor to be transported, or lowered when the radiator is "set" preparatory to installing it at the particular place at which it is to be used. The two side bars 1 and 2 constitute legs, the lower ends of which are bent laterally as at 6 and 7 and then upwardly, as at 8 and 9, so that the ends of the legs or side bars 1 and 2 may be bent back upon themselves and secured together to form feet which may carry casters 10 and 11.

Fastened to the bar 5 is a spaced bracket 12, in which one end of a shaft 13 is journaled, the other end of the shaft projecting through the bar 5 and carrying a crank 14.

Rigid on the shaft 13 is a pinion 15, which is in constant mesh with the teeth of a rack bar 16, slidably mounted in the bracket 12 and having rigidly secured to its lower end a cross bar 3 guided in the channels 18 and 19 of the side bars 1 and 2. The cross bar 3 carries radiator-supporting hooks 20 and 21, which are adapted to engage under the radiator and form seats therefor so that by raising the bar 16 of one truck member, one end of the radiator 22 will be raised. The rack bar 16 will be held in any vertical adjusted position by the detent 23, shown as a dog, mounted on the shaft 24 in the bracket bar 5. On the end of the shaft 24 is an arm 25 to which is connected a pull rod 26, accessible from the side of the truck member. By pulling on the rod 26 in one direction, the dog 23 will be thrown out of engagement with one of the notches or teeth 27 of the bar 16 so that the radiator can be lowered to the floor of the building. Normally, however, the dog or detent 23 is urged into tooth-engaging position by the spring 28.

In order to prevent tilting or sidewise movement of the radiator, I provide two jaw members 29 and 30 on the ends of the slidable bars 31 and 32 mounted in the guide 34 carried by the top bar 4. The guide 34 is box-shaped or rectangular in cross section so as to provide a guiding panel for the bars 31 and 32. The bar 31 has teeth 35 at its lower edge and the bar 32 has similar teeth at its upper edge. The bars 31 and 32 will be held in adjusted positions to permit the jaws 29 and 30 to tightly grip the radiator by the detents or dogs 36 and 37 adapted to be moved out of tooth-engaging position by the levers 38 and 39. The detents 36 and 37 are urged into tooth-engaging position, however, by springs 40 and 41 which bear against the levers 38 and 39; the springs being carried by the bar 4, as clearly seen in Fig. 4.

By spreading the ends of the levers 38 and 39, both dogs 36 and 37 will be out of engagement with the bars 31 and 32 and consequently, the bars can be slid longitudinally to adjust the jaws 29 and 30. Then the springs 40 and 41 will urge the detents 36 and 37 into bar-engaging position so that the jaws will be held in clamped relation with respect to the radiator 22.

Each truck member carries a laterally projecting lug 42 through which loosely projects an eye-bolt 43. On the threaded eye-bolt is a threaded crank nut 44, which can be turned to draw the bolt longitudinally, and connected to the eye portion of the bolt is a chain or flexible connection 45, adapted to be received between the bifurcated jaw 46 on the complementary member, it being understood that there are two like members generically designated A and B and that preferably each member carries one eye-bolt and one bifurcated jaw, the eye-bolts being at opposite ends of the radiator, that is, on diametrically opposite corners of the completed truck structure when the truck members are fastened to the radiator. Therefore, it will be seen that if the chain is caused to engage a bifurcated jaw 46 and the crank nut is turned to draw the chain taut, the two truck members A and B will be rigidly held against the ends of the radiator. The frame members, however, will not bind against the radiators with sufficient friction to prevent the radiator from being raised and the two side members or jaws 29 and 30 will hold the radiator against tilting sidewise.

The members A and B may carry cross bars or handle bars 47 at their upper ends so that the entire organization consisting of both truck members and the radiator may be lifted if desired and if found expedient, the rectangular frame of each member may be reinforced by diagonal braces 48 and 49, as clearly shown in Fig. 1.

It will be apparent that the truck members can be easily and expeditiously moved up to the radiator so that the hook-shaped seats 20 and 21 can be moved under the ends of the radiator. The jaws 29 and 30 on the ends of the arms 31 and 32 can be caused to engage the sides of the radiator, then the crank 14 can be turned so as to raise the elevating bar or jack 16 to lift the radiator from the ground and the detent or dog 23 will hold the bar in its raised positioned so that the radiator can be moved from place to place. When the radiator has been moved into position, the pull bar 26 may be moved in one direction, withdrawing the detent 23 from the bar 16 so that the weight of the radiator will be sufficient to permit it to be lowered to the floor. Then the chains 45 can be snapped out of the jaws 46 and the bars 31 and 32 can be moved slightly longitudinally to spread the jaws 29 and 30, whereupon the truck members can be removed to be used again.

The device will be made of material sufficiently rugged to withstand rough usage. Wherever possible it is recommended that commercial shapes be employed in the frame work for the sake of cheapness although I do not wish to be limited to the use of commercial shapes as the guides may be made of especially formed material if desired.

What I claim and desire to secure by Letters-Patent is:

1. A radiator truck comprising separate truck members each consisting of spaced channel end bars, cross bars connecting the end bars, a cross bar slidable in the end bars, means on the slidable cross bar for supporting a radiator, rack and pinion connection between the slidable cross bar and one of the connecting cross bars, and means on one of the connecting bars for clamping the member to a radiator.

2. A radiator truck comprising separate truck members, each consisting of spaced channel end bars, cross bars connecting the end bars, a cross bar slidable in the end bars and provided with a rack, means on the slidable cross bar for supporting a radiator, a pinion on one of the connecting bars engaging the rack, jaws on one of the connecting bars, means for adjusting said jaws to grip a radiator, and adjusting means connecting the separate truck members to attach same to a radiator.

In testimony whereof I affix my signature.

THEODORE E. BATEMAN.